United States Patent [19]
Bahls et al.

[11] Patent Number: 5,692,156
[45] Date of Patent: Nov. 25, 1997

[54] COMPUTER PROGRAM PRODUCT FOR OVERFLOW QUEUE PROCESSING

[75] Inventors: Jim W. Bahls, Pleasanton; George S. Denny, San Jose; Richard G. Hannan, San Jose; Janna L. Mansker, San Jose; Bruce E. Naylor, Morgan Hill; Betty J. Patterson, San Jose; Sandra L. Stoob, Morgan Hill; Judy Y. Tse, San Francisco; Anuradha V. Vakkalagadda, San Jose, all of Calif.

[73] Assignee: International Business Machines Corp., Armonk, N.Y.

[21] Appl. No.: 508,911

[22] Filed: Jul. 28, 1995

[51] Int. Cl.$^6$ .............................. G06F 12/00; G06F 12/12; G06F 13/00
[52] U.S. Cl. .................... 395/492; 395/481; 395/486; 395/874; 395/877; 364/DIG. 1
[58] Field of Search ........................... 395/492, 874, 395/877, 481, 486

[56] References Cited

U.S. PATENT DOCUMENTS

| | | | |
|---|---|---|---|
| 4,433,378 | 2/1984 | Leger | 395/280 |
| 4,962,393 | 10/1990 | Fulton et al. | 347/111 |
| 5,068,784 | 11/1991 | Kishino et al. | 395/877 |
| 5,072,420 | 12/1991 | Conley et al. | 395/877 |
| 5,166,930 | 11/1992 | Braff et al. | 370/94.1 |
| 5,519,701 | 5/1996 | Colmant et al. | 370/60.1 |
| 5,537,552 | 7/1996 | Ogasawara et al. | 395/250 |

*Primary Examiner*—Frank J. Asta
*Attorney, Agent, or Firm*—David J. Kappos, Esq.; Sterne, Kessler, Goldstein & Fox P.L.L.C.

[57] ABSTRACT

Described herein is a computer program product comprising a computer useable medium having computer program logic recorded thereon for enabling a processor in a computer system to manage a plurality of data structures stored in a computer storage medium. The computer storage medium includes a primary storage medium and an overflow storage medium. The computer program logic enables the processor to receive a request to store a data object in a target data structure, and enables the processor to determine whether an overflow mode condition currently exists. If it is determined that an overflow mode condition does not currently exist, then the computer program product enables the processor to determine whether a combined size of all data structures stored in the primary storage medium plus a size of the data object is greater than a predetermined threshold. If it is determined that a combined size of all data structures stored in the primary storage medium plus a size of the data object is greater than a predetermined threshold, then the computer program product enables the processor to enter an overflow mode such that an overflow mode condition exists. Once in the overflow mode, the computer program product enables the processor to select one or more data structures currently stored in the primary storage medium, and enables the processor to move the selected data structures from the primary storage medium to the overflow storage medium.

28 Claims, 5 Drawing Sheets

COMPUTER PROGRAM PRODUCT FOR OVERFLOW QUEUE PROCESSING

CROSS-REFERENCE TO OTHER APPLICATIONS

The following application of common assignee contains some common disclosure, and is believed to have an effective filing date identical with that of the present application.

"SYSTEM AND METHOD FOR OVERFLOW QUEUE PROCESSING," application Ser. No. 08/506,922 still pending.

DESCRIPTION

1. Technical Field

The present invention relates generally to data storage and retrieval in a data processing environment, and more particularly to a system and method for processing queues so as to avoid a queue full condition.

2. Background Art

In some data processing systems, a plurality of applications store data in and retrieve data from a shared queue that is implemented on a computer storage medium. The computer storage medium has a finite storage capacity. Thus, a situation can arise where the shared queue grows to such a size that it occupies the entire computer storage medium.

When this occurs, it is not possible to store any additional information in the shared queue. In such cases, the shared queue is said to have reached a "queue full condition."

Conventionally, new requests to store information in a shared queue are rejected while a queue full condition exists. Such new requests are processed only after information has been removed (i.e., "drained") from the shared queue. After such draining, the queue full condition no longer exists.

This approach is not ideal, however, because it results in degrading overall system performance. This is the case, because requests to store information in the shared queue are not immediately processed, and because such requests must be transmitted from the applications to the shared queue multiple times.

Thus, what is required is a system and method for managing a shared queue so as to avoid or minimize the impact of a queue full condition.

DISCLOSURE OF INVENTION

Briefly stated, the present invention is directed to a program storage device readable by a machine, tangibly embodying a program of instructions executable by the machine to perform method steps for managing a plurality of data structures stored in a computer storage medium. The computer storage medium includes a primary storage medium and an overflow storage medium. The method steps include:

(1) receiving a request to store a data object in a target data structure;

(2) determining whether an overflow mode condition currently exists;

(3) if an overflow mode condition does not currently exist, then determining whether a combined size of all data structures stored in the primary storage medium plus a size of the data object is greater than a predetermined threshold;

(4) if a combined size of all data structures stored in the primary storage medium plus a size of the data object is greater than a predetermined threshold, then:

(a) entering an overflow mode such that an overflow mode condition exists;

(b) selecting one or more data structures currently stored in the primary storage medium; and (c) moving the selected data structures from the primary storage medium to the overflow storage medium.

The invention is also directed to a computer program product comprising a computer useable medium having computer program logic recorded thereon for enabling a processor in a computer system to manage a plurality of data structures stored in a computer storage medium. The computer storage medium includes a primary storage medium and an overflow storage medium.

The computer program logic enables the processor to receive a request to store a data object in a target data structure, and enables the processor to determine whether an overflow mode condition currently exists. If it is determined that an overflow mode condition does not currently exist, then the computer program product enables the processor to determine whether a combined size of all data structures stored in the primary storage medium plus a size of the data object is greater than a predetermined threshold.

If it is determined that a combined size of all data structures stored in the primary storage medium plus a size of the data object is greater than a predetermined threshold, then the computer program product enables the processor to enter an overflow mode such that an overflow mode condition exists. Once in the overflow mode, the computer program product enables the processor to select one or more data structures currently stored in the primary storage medium, and enables the processor to move the selected data structures from the primary storage medium to the overflow storage medium.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF FIGURES

The present invention will be described with reference to the accompanying drawings, wherein.

BEST MODE FOR CARRYING OUT THE INVENTION

The present invention is directed to a system and method for managing a shared queue so as to avoid or minimize the impact of a queue full condition.

Figure 1:
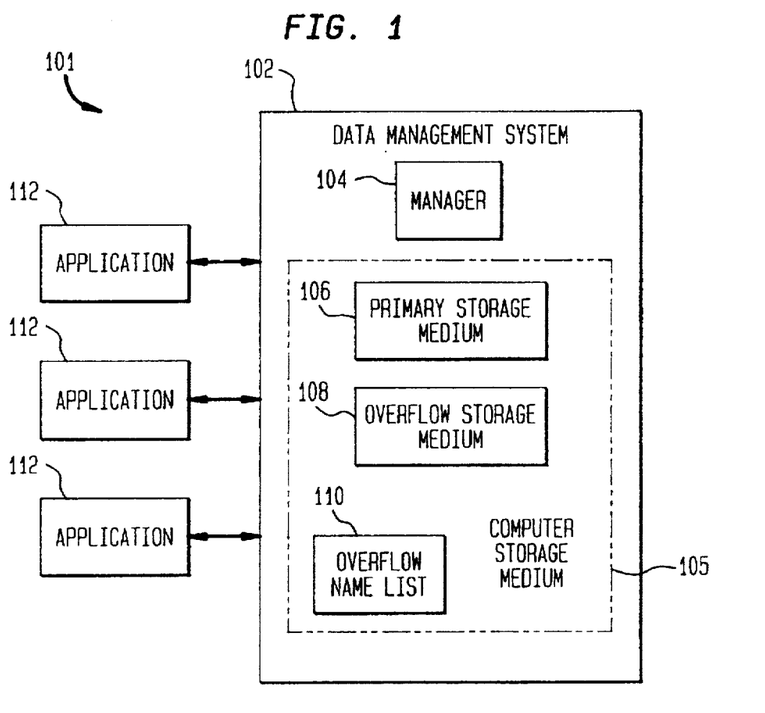
FIG. 1 is a data processing environment according to a preferred embodiment of the present invention.

FIG. 1 is a block diagram of a data processing environment 101 according to a preferred embodiment of the present invention. The data processing environment 101 includes a plurality of applications 112 (each representing a software program executing in a computer) interacting with a computer storage system, such as data management system 102.

The data management system 102 includes a manager 104 and a computer storage medium 105 having a finite storage capacity. The size of the computer storage medium 105 is implementation dependent. At any time, zero or more data structures are stored in the computer storage medium 105. The manager 104 controls access to and manages these data structures.

Preferably, the data structures stored in the computer storage medium 105 represent queues, and the invention is described below with respect to the use and management of queues. It should be understood, however, that the invention is not limited to the use and management of queues. Instead, any well known data structure may be used in place of queues.

The computer storage medium 105 includes a primary storage medium 106 and an overflow storage medium 108. The queues are stored in the primary storage medium 106 and (possibly) the overflow storage medium 108. An overflow name list 110 is preferably stored in the computer storage medium 105. The names of any queues stored in the overflow storage medium are stored in the overflow name list 110.

The invention operates as follows. When the manager 104 detects that the combined size of the queues in the primary storage medium 106 has reached a predetermined threshold (which is preferably a percentage of the total storage capacity of the primary storage medium 106), then the manager enters an overflow mode and performs overflow threshold processing (an overflow mode condition is said to exist). During overflow threshold processing, the queues having the most data objects enqueued are selected and moved from the primary storage medium 106 to the overflow storage medium 108. Once these selected queues are moved to the overflow storage medium 108, any subsequent accesses to these queues by the applications 112 are processed using the overflow storage medium 108 until the overflow mode is exited.

By moving queues with the most data objects to the overflow storage medium 108, storage space on the primary storage medium 106 is reclaimed. This allows additional data objects to be placed on to the queues remaining in the primary storage medium 106. The manager 104 also allows data objects to be placed on to the queues in the overflow storage medium 108. If the overflow storage medium 108 becomes full, new work for the queues stored therein is rejected.

The manager 104 exits the overflow mode when the following two conditions are met: (1) all data objects on the overflow storage medium 108 have been removed from the overflow storage medium 108; and (2) usage of the primary storage medium 106 is below the predetermined threshold.

Figure 2:
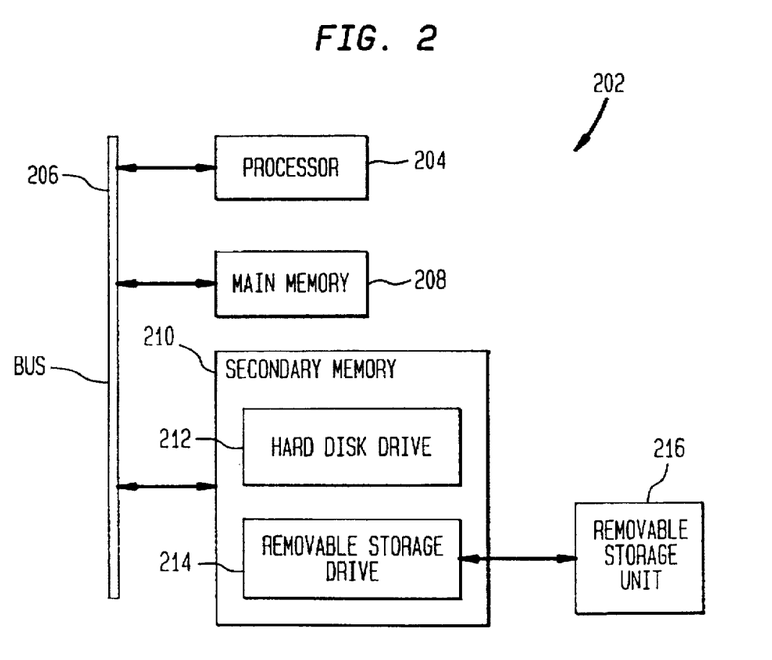
FIG. 2 is a block diagram of a computer system according to a preferred embodiment of the present invention.

Preferably, the data management system 102 is implemented using a computer system 202 as shown in FIG. 2. The computer system 202 includes one or more processors, such as processor 204. The processor 204 is connected to a communication bus 206.

The computer system 202 also includes a main memory 208, preferably random access memory (RAM), and a secondary memory 210. The main memory 208 and/or the secondary memory 210 represent the computer storage medium 105.

The secondary memory 210 includes, for example, one or more hard disk drives 212 and/or one or more removable storage drives 214, each representing a floppy disk drive, a magnetic tape drive, a compact disk drive, etc. These devices may be connected directly to the bus 206 or may be connected over a network (not shown). The removable storage drives 214 each reads from and/or writes to a removable storage unit 216 in a well known manner.

Removable storage unit 216, also called a program storage device or a computer program product, represents a floppy disk, magnetic tape, compact disk, etc. As will be appreciated, the removable storage unit 216 includes a computer usable storage medium having stored therein computer software and/or data.

Computer programs (also called computer control logic) are stored in main memory 208 and/or the secondary memory 210. Such computer programs, when executed, enable the computer system 202 to perform the features of the present invention as discussed herein. In particular, the computer programs, when executed, enable the processor 204 to perform the features of the present invention. Accordingly, such computer programs represent controllers of the computer system 202. (For example, the manager 104 preferably represents a computer program executing in the computer system 202.)

In another embodiment, the invention is directed to a computer program product comprising a computer readable medium having control logic (computer software) stored therein. The control logic, when executed by the processor 204, causes the processor 204 to perform the functions of the invention as described herein.

In another embodiment, the invention (particularly the manager 104) is implemented primarily in hardware using, for example, a hardware state machine. Implementation of the hardware state machine so as to perform the functions described herein will be apparent to persons skilled in the relevant art(s).

The applications 112 each preferably represents a computer program executing in a computer system such as that shown in FIG. 2.

Storing a Data Object In a Queue

The operation of the invention shall now be described in greater detail.

Figure 3A:
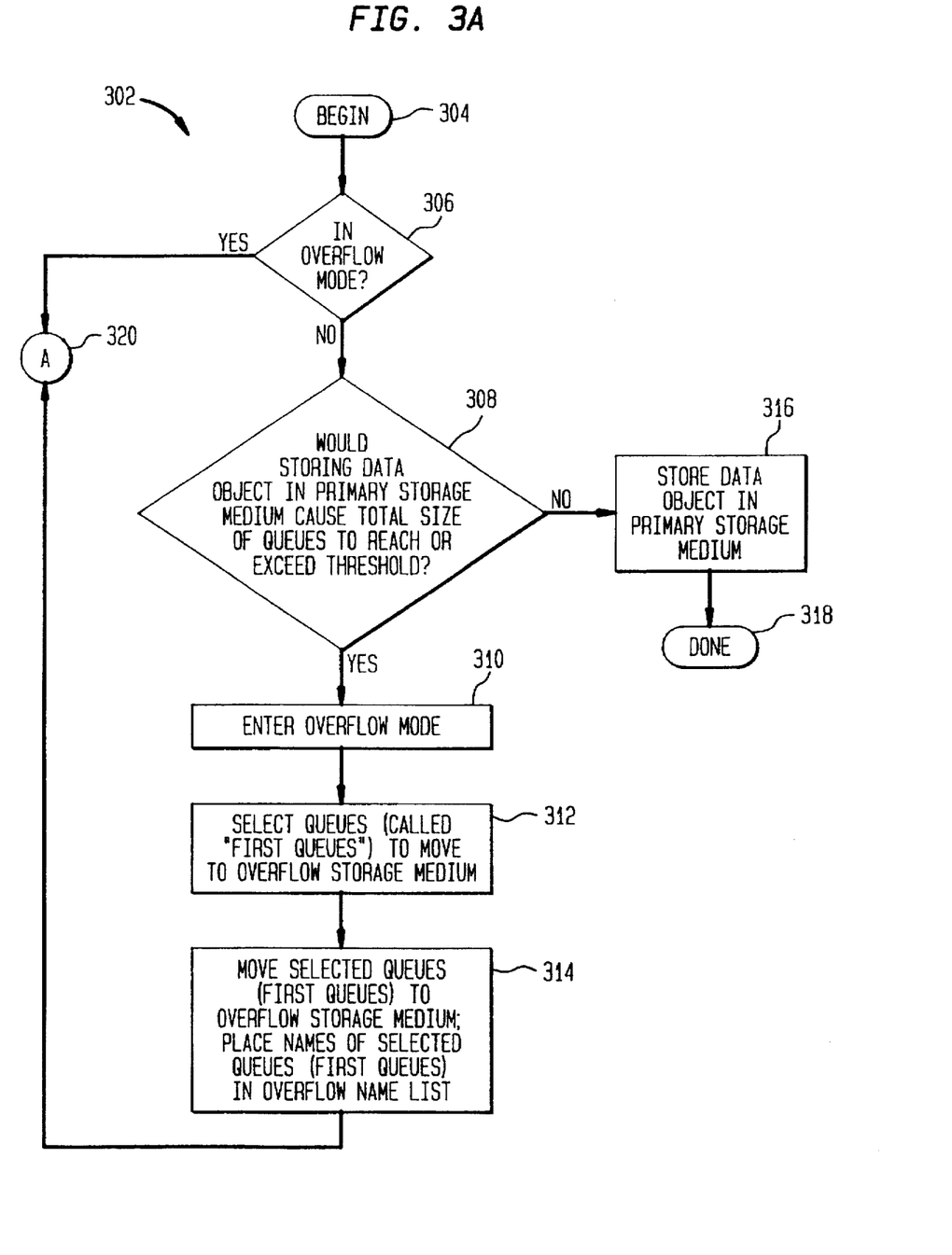
FIGS. 3A, 3B, 4, and 5 are flowcharts depicting the preferred operation of the invention.
Figure 3B:
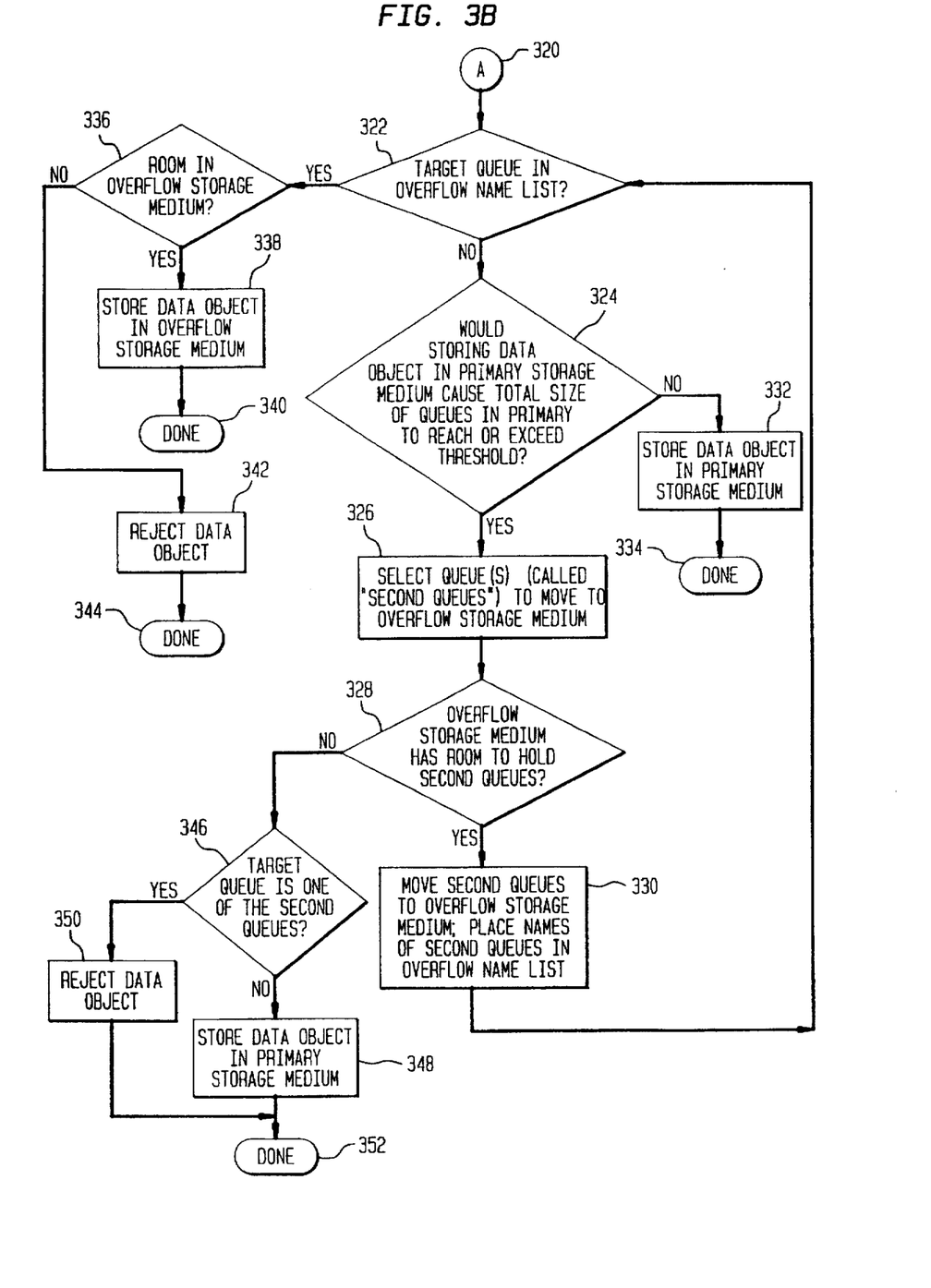

FIGS. 3A and 3B collectively depict a flowchart 302 representing the operation of the invention when an application 112 sends to the manager 104 a request (called the "request being processed" for reference purposes) to add a data object to a queue. For reference purposes, this queue is called the "target queue." Flowchart 302 begins with step 304, where control immediately passes to step 306.

In step 306, the manager 104 determines whether it is currently in overflow mode (by accessing an appropriate flag, for example). If it is in overflow mode, then control flows to step 322 in FIG. 3B. Step 322 is described below. If it is not in overflow mode, then step 308 is performed. It is noted that, if the manager 104 is not in overflow mode, then all queues (including the target queue) are stored in the primary storage medium 106. The overflow storage medium 108 and the overflow name list 110 are empty.

In step 308, the manager 104 determines whether the act of adding the data object to the target queue in the primary storage medium 106 would result in the combined size of all queues on the primary storage medium 106 to reach or exceed a predetermined threshold. The predetermined threshold is preferably equal to: (predetermined percentage) *(total storage capacity of the primary storage medium 106). The values of the predetermined percentage and the predetermined threshold are implementation dependent. For example, the predetermined percentage may be equal to 70%, such that the predetermined threshold is equal to 70% of the total storage capacity of the primary storage medium 106. Thus, in step 308, the manager 104 determines whether the act of adding the data object to the target queue in the primary storage medium 106 would result in the combined size of all queues on the primary storage medium 106 to reach or exceed 70% of the total storage capacity of the primary storage medium 106. In one embodiment, the predetermined percentage is equal to a value in the range from 50%–70%, although the invention is not limited to these values.

If the act of adding the data object to the target queue in the primary storage medium 106 would not result in the combined size of all queues on the primary storage medium 106 to reach or exceed the predetermined threshold, then step 316 is performed. In step 316, the manager 104 adds the data object to the target queue in the primary storage medium 106. Flowchart 302 is complete after the performance of step 316, as indicated by step 318.

If, instead, the act of adding the data object to the target queue in the primary storage medium 106 would result in the combined size of all queues on the primary storage medium 106 to reach or exceed the predetermined threshold, then step 310 is performed.

In step 310, the manager 104 enters overflow mode (the manager 104 may set an overflow flag).

In step 312, the manager 104 begins to select queues in the primary storage medium 106. Preferably, the manner 104 selects the queues having the most data objects enqueued thereon (i.e., the selection process moves in a descending order based on the number of data objects on each of the queues). The manager 104 stops selecting queues once a predetermined number of queues has been selected (this predetermined number is implementation dependent), or once the size of the selected queues is equal to or exceeds a predetermined amount (this predetermined amount is implementation dependent). In one embodiment, the predetermined number is equal to 512 and the predetermined amount is equal to 20%, although the invention is not limited to these values. The selected queues are called "first queues" for reference purposes.

In step 314, the manager 104 moves the first queues from the primary storage medium 106 to the overflow storage medium 108. Also, the manager 104 places the names (or some other identifiers) of the first queues into the overflow name list 110.

Step 322 in FIG. 3B is then performed. In step 322, the manager 104 determines whether the target queue is in the overflow storage medium 108 by checking to see if the name of the target queue is in the overflow name list 110 (alternatively, the manager 104 may determine whether the target queue is in the overflow storage medium 108 by scanning the overflow storage medium 108). If the target queue is in the overflow storage medium 108, then the manager 104 knows that it must directly access the overflow storage medium 108 to service the request being processed. In particular, the manager 104 performs step 336.

In step 336, the manager 104 determines whether the overflow storage medium 108 has sufficient available storage capacity to accommodate the data object. If the overflow storage medium 108 has sufficient available storage capacity to accommodate the data object, then step 338 is performed. In step 338, the manager 104 adds the data object to the target queue in the overflow storage medium 108. Flowchart 302 is complete after step 338 is performed, as indicated by step 340.

If, in step 336, the manager 104 determines that the overflow storage medium 108 does not have sufficient available storage capacity to accommodate the data object, then step 342 is performed. In step 342, the manager 104 rejects the data object. The details of such rejection are implementation dependent. For example, the manager 104 may require that the application 112 retransmit the request to store the data object at a later time. Alternatively, the manager 104 may retain the request until it is possible to process it. Other rejection protocols will be apparent to persons skilled in the relevant art(s). Flowchart 302 is complete after step 342 is performed, as indicated by step 344.

An advantage of the invention should now be apparent. By employing an overflow protocol that employs a primary storage medium 106 and an overflow storage medium 108, the invention operates to isolate "faulty" applications (also called "runaway applications") from "non-faulty" applications.

Faulty applications tend to write excessive amounts of data objects to their queues (i.e., the queues being used by the faulty applications). Thus, these queues tend to become larger in size than the queues being used by non-faulty applications. According to the present application, the queues having the most data objects (and being most likely associated with the faulty applications) are moved to the overflow storage medium 108. Thus, the queues associated with non-faulty applications remain on the primary storage medium 106, while queues associated with faulty applications are moved to the overflow storage medium 108. Accordingly, non-faulty applications are isolated from faulty applications.

The faulty applications may cause the overflow storage medium 108 to fill to capacity (such that subsequent attempts to write to their queues will be rejected), but that is not of great importance since such applications are, by definition, faulty. What is important is that a queue full condition on the overflow storage medium 108 does not affect the primary storage medium 106. Accordingly, non-faulty applications can operate normally, even when faulty applications exist.

If, in step 322, the manager 104 determines that the target queue is not in the overflow storage medium 108, then the manager 104 knows that the target queue is in the primary storage medium 106. The manager 104 then performs step 324. In step 324, the manager 104 determines whether the act of adding the data object to the target queue in the primary storage medium 106 would result in the combined size of all queues on the primary storage medium 106 to reach or exceed the predetermined threshold (discussed above with reference to step 308).

If the act of adding the data object to the target queue in the primary storage medium 106 would not result in the combined size of all queues on the primary storage medium 106 to reach or exceed the predetermined threshold, then step 332 is performed. In step 332, the manager 104 adds the data object to the target queue in the primary storage medium 106. Flowchart 302 is complete after the performance of step 332, as indicated by step 334.

If, instead, the act of adding the data object to the target queue in the primary storage medium 106 would result in the combined size of all queues on the primary storage medium 106 to reach or exceed the predetermined threshold, then step 326 is performed.

In step 326, the manager 104 begins to select queues in the primary storage medium 106. As in step 312 (discussed above), the manner 104 preferably selects the queues having the most data objects enqueued thereon (i.e., the selection process moves in a descending order based on the number of data objects on each of the queues). The manager 104 stops selecting queues once a predetermined number of queues has been selected (this predetermined number is implementation dependent, and may be the same as or different from the predetermined number discussed above with respect to step 312), or once the size of the selected queues is equal to or exceeds a predetermined amount (this predetermined amount is implementation dependent, and may be the same as or different from the predetermined amount discussed above with respect to step 312). The selected queues are called "second queues" for reference purposes.

In step 328, the manager 104 determines whether the overflow storage medium 108 has sufficient available storage capacity to accommodate all of the second queues. If the overflow storage medium 108 has sufficient available storage capacity to accommodate all of the second queues, then the manager 104 in step 330 moves the second queues from the primary storage medium 106 to the overflow storage medium 108. Also, the manager 104 places the names (or some other identifiers) of the second queues into the overflow name list 110. Control then flows back to step 322.

If, in step 328, the manager 104 determines that the overflow storage medium 108 does not have sufficient available storage capacity to accommodate all of the second queues, then the manager 104 rejects all attempts to store additional data in the second queues. The manager 104 does this since such second queues may be associated with faulty applications. Thus, this is another example of how the invention isolates non-faulty applications from faulty applications. In particular, in step 346 the manager 104 determines whether the target queue is one of the second queues. If the target queue is not one of the second queues, then the manager 104 in step 348 adds the data object to the target queue in the primary storage medium 106. If, instead, the target queue is determined to be one of the second queues, then the manager 104 in step 350 rejects the data object (i.e., does not store the data object in the target queue). This is the case, even though the target queue is still in the primary storage medium 106.

Flowchart 302 is complete after the performance of either step 348 or step 350, as indicated by step 352.

Retrieving a Data Object From a Queue

Figure 4:
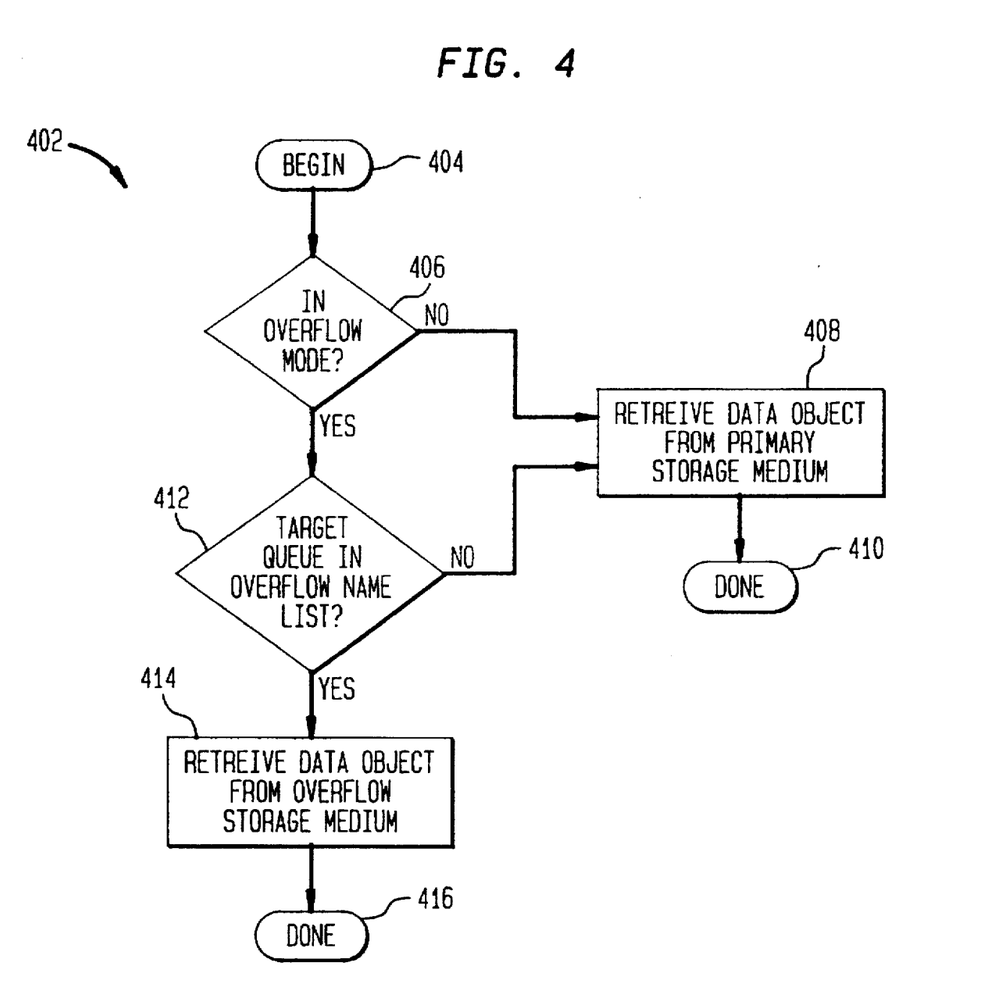

FIG. 4 is a flowchart 402 depicting the operation of the invention when the manager 104 is processing a request from an application 112 to retrieve a data object from a queue (again called the target queue for reference purposes). Flowchart 402 begins with step 404, where control immediately passes to step 406.

In step 406, the manager 104 determines whether it is executing in overflow mode (by accessing an appropriate flag, for example). If it is not executing in overflow mode, then the manager 104 in step 408 retrieves the data object from the target queue located on the primary storage medium 106. Flowchart 402 is complete after the performance of step 408, as indicated by step 410.

If, instead, the manager 104 is executing in overflow mode, then step 412 is performed. In step 412, the manager 104 accesses the overflow name list 110 to determine whether the target queue is in the overflow storage medium 108. If the target queue is not in the overflow storage medium 108, then step 408 is performed (described above). Otherwise, the manager 104 in step 414 retrieves the data object from the target queue located on the overflow storage medium 108. Flowchart 402 is complete after the performance of step 414, as indicated by step 416.

Deleting a Data Object From a Queue

It is assumed herein that retrieval of a data object from a queue does not result in deletion of the data object from the queue. To delete a data object from a queue, it is necessary to execute a delete operation.

Figure 5:
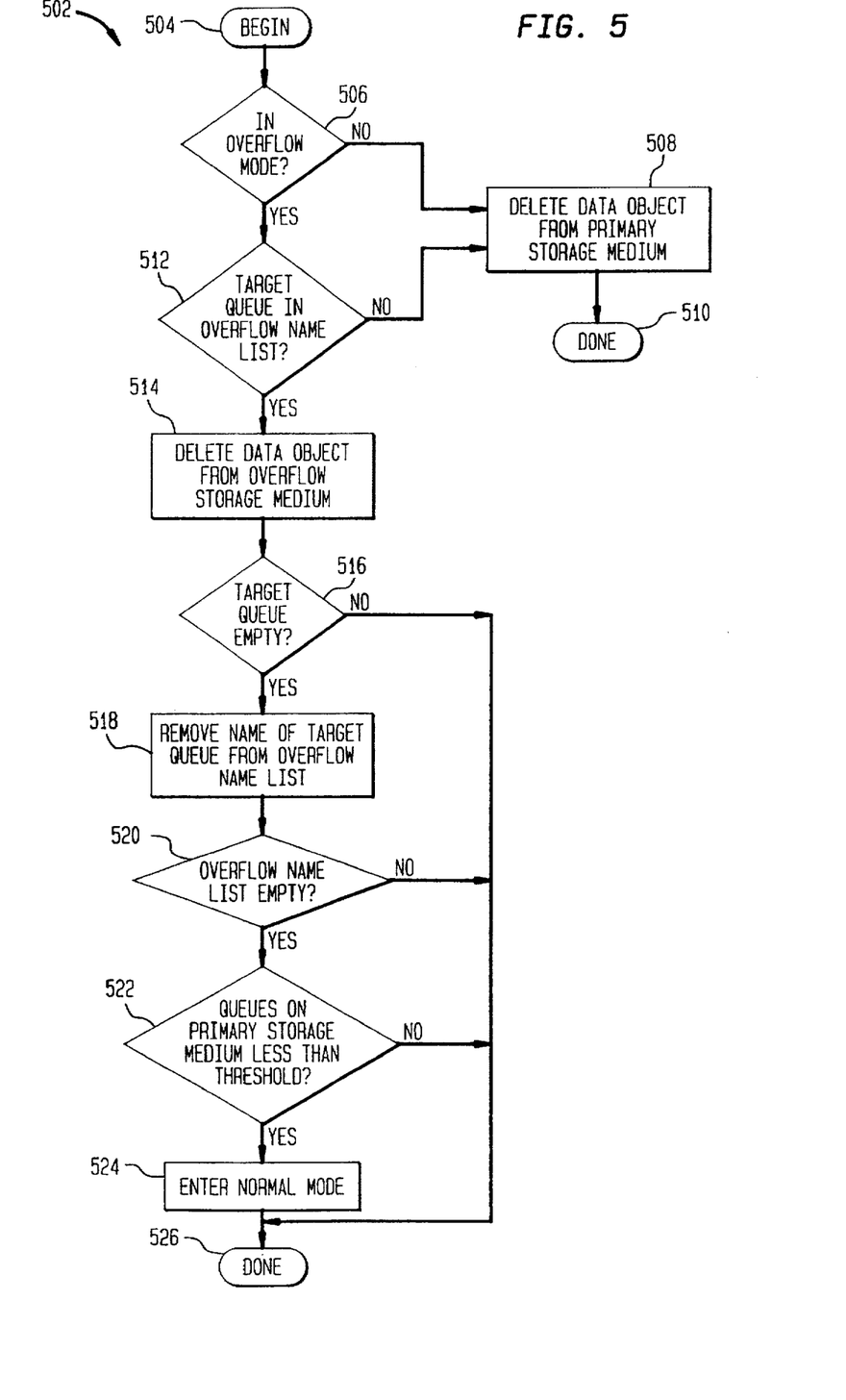

FIG. 5 is a flowchart 502 depicting the operation of the manager 104 when processing a request from an application 112 to delete a data object from a queue (again called the target queue).

It should be understood that the invention contemplates both the retrieval and deletion of a data object from a queue upon the processing of a single retrieval command. In such embodiments, the steps of flowchart 502 are performed after the completion of flowchart 402.

Flowchart 502 begins with step 504, where control immediately passes to step 506. In step 506, the manager 104 determines whether it is executing in overflow mode (by accessing an appropriate flag, for example). If it is not executing in overflow mode, then the manager 104 in step 508 deletes the data object from the target queue located on the primary storage medium 106. Flowchart 502 is complete after the performance of step 508, as indicated by step 510.

If, instead, the manager 104 is executing in overflow mode, then step 512 is performed. In step 512, the manager 104 accesses the overflow name list 110 to determine whether the target queue is in the overflow storage medium 108. If the target queue is not in the overflow storage medium 108, then step 508 is performed (described above). Otherwise, the manager 104 in step 514 deletes the data object from the target queue located on the overflow storage medium 108.

In steps 516, 518, 520, 522, and 524, the manager 104 determines whether it should exit the overflow mode and return to the normal mode (i.e., the non-overflow mode). Specifically, in step 516 the manager 104 determines whether the target queue is empty. If the target queue is not empty, then there is at least one non-empty queue on the overflow storage medium 108. If this is the case, then the manager 104 remains in the overflow mode. Flowchart 502 is then complete, as indicated by step 526.

If, in step 516, the manager 104 determines that the target queue is empty, then the manager 104 in step 518 deletes the target queue from the overflow storage medium 108 and removes the name of the target queue from the overflow name list 110.

In steps 520 and 522, the manager 104 determines whether the overflow storage medium 108 is devoid of queues (by seeing if the overflow name list 110 is empty), and whether the total size of all queues on the primary storage medium 106 is less than the predetermined threshold (discussed above with reference to step 308 in FIG. 3A). If both these conditions are not true, then the manager 104 remains in the overflow mode. Flowchart 502 is then complete, as indicated by step 526. However, if both of these conditions are true, then in step 524 the manager 104 enters the normal mode. While in the normal mode, all queues are stored in the primary storage medium 106, and the overflow storage medium 108 and the overflow name list 110 are empty. Flowchart 502 is then complete, as indicated by step 526.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A program storage device readable by a machine, tangibly embodying a program of instructions executable by the machine to perform method steps for managing a plurality of data structures stored in a computer storage medium, the computer storage medium comprising a primary storage medium and an overflow storage medium, said method steps comprising:
- (1) receiving a request to store a data object in a target data structure;
- (2) determining whether an overflow mode condition currently exists;
- (3) if an overflow mode condition does not currently exist, then determining whether a combined size of all data structures stored in the primary storage medium plus a size of the data object is greater than a predetermined threshold;
- (4) if a combined size of all data structures stored in the primary storage medium plus a size of the data object is greater than a predetermined threshold, then:
  - (a) entering an overflow mode such that an overflow mode condition exists;
  - (b) selecting one or more data structures currently stored in the primary storage medium; and
  - (c) moving said selected data structures from the primary storage medium to the overflow storage medium.

2. The program storage device of claim 1, wherein said data structures represent queues.

3. The program storage device of claim 1, wherein said predetermined threshold is equal to a percentage of a total storage capacity of said primary storage medium.

4. The program storage device of claim 1, wherein step (b) comprises the step of:
selecting one or more data structures having the greatest number of elements until a size of said selected data structures is greater than a predetermined amount.

5. The program storage device of claim 1, wherein step (b) comprises the step of:
selecting a predetermined number of data structures having the greatest number of elements.

6. The program storage device of claim 1, said method steps further comprising the step of:
- (5) if a combined size of all data structures stored in the primary storage medium plus a size of the data object is not greater than a predetermined threshold, then storing the data object in said target data structure in said primary storage medium.

7. The program storage device of claim 1, said method steps further comprising the steps of:
- (5) if an overflow mode condition currently exists, then determining whether the target data structure is stored in the overflow storage medium;
- (6) if the target data structure is stored in the overflow storage medium, then determining whether the overflow storage medium has adequate available storage capacity to accommodate the data object;
- (7) if the overflow storage medium has adequate available storage capacity to accommodate the data object, then storing the data object in the target data structure in the overflow storage medium; and
- (8) if the overflow storage medium does not have adequate available storage capacity to accommodate the data object, then rejecting the data object.

8. The program storage device of claim 1, said method steps further comprising the steps of:
- (5) if an overflow mode condition currently exists, then determining whether the target data structure is stored in the overflow storage medium;
- (6) if the target data structure is not stored in the overflow storage medium, then determining whether a combined size of all data structures stored in the primary storage medium plus a size of the data object is greater than a second predetermined threshold;
- (7) if a combined size of all data structures stored in the primary storage medium plus a size of the data object is greater than the second predetermined threshold, then:
  - (I) selecting one or more second data structures currently stored in the primary storage medium;
  - (II) determining whether the overflow storage medium has sufficient available storage capacity to accommodate said selected second data structures; and
  - (III) if the overflow storage medium has sufficient available storage capacity to accommodate said selected second data structures, then moving said selected second data structures from the primary storage medium to the overflow storage medium.

9. The program storage device of claim 8, said method steps further comprising the step of:
- (8) if it is determined in step (6) that a combined size of all data structures stored in the primary storage medium plus a size of the data object is not greater than the second predetermined threshold, then storing the data object in the target data structure in the primary storage medium.

10. The program storage device of claim 8, said method steps further comprising the steps of:
- (8) if the overflow storage medium does not have sufficient available storage capacity to accommodate said selected second data structures, then determining whether the target data structure is one of said selected second data structures;
- (9) if the target data structure is one of said selected second data structures, then rejecting the data object; and
- (10) if the target data structure is not one of said selected second data structures, then storing the data object in the target data structure in the primary storage medium.

11. The program storage device of claim 7, wherein step (c) comprises the step of:
placing identifiers of said selected data structures in an overflow name list;
wherein step (5) comprises the step of:
checking said overflow name list to determine whether said target data structure is stored in the overflow storage medium.

12. The program storage device of claim 1, said method steps further comprising the steps of:
- (5) receiving a request to retrieve a second data object from a second target data structure;
- (6) determining whether an overflow mode condition currently exists;
- (7) if an overflow mode condition does not currently exist, then accessing said primary storage medium to retrieve said second data object from said second target data structure;
- (8) if an overflow mode condition currently exists, then determining whether said second target data structure is stored on said overflow storage medium;
- (9) if said second target data structure is stored on said overflow storage medium, then accessing said overflow storage medium to retrieve said second data object from said second target data structure; otherwise, accessing said primary storage medium to retrieve said second data object from said second target data structure.

13. The program storage device of claim 1, said method steps further comprising the step of:
    (5) if an overflow mode condition currently exists, then exiting the overflow mode condition if:
        (I) no data structures are stored in the overflow storage medium; and
        (II) a combined size of all data structures stored in the primary storage medium is less than the predetermined threshold.

14. The program storage device of claim 8, wherein said first predetermined threshold is equal to said second predetermined threshold.

15. A computer program product comprising a computer useable medium having computer program logic recorded thereon for enabling a processor in a computer system to manage a plurality of data structures stored in a computer storage medium, the computer storage medium comprising a primary storage medium and an overflow storage medium, the computer program logic comprising:
    receiving means for enabling the processor to receive a request to store a data object in a target data structure;
    overflow determining means for enabling the processor to determine whether an overflow mode condition currently exists;
    threshold determining means, responsive to a determination that an overflow mode condition does not currently exist, for enabling the processor to determine whether a combined size of all data structures stored in the primary storage medium plus a size of the data object is greater than a predetermined threshold;
    overflow mode means, responsive to a determination that a combined size of all data structures stored in the primary storage medium plus a size of the data object is greater than a predetermined threshold, for enabling the processor to enter an overflow mode such that an overflow mode condition exists;
    data structure selecting means, responsive to said overflow mode means, for enabling the processor to select one or more data structures currently stored in the primary storage medium; and
    data structure moving means, responsive to said data structure selecting means, for enabling the processor to move said selected data structures from the primary storage medium to the overflow storage medium.

16. The computer program product of claim 15, wherein said data structures represent queues.

17. The computer program product of claim 15, wherein said predetermined threshold is equal to a percentage of a total storage capacity of said primary storage medium.

18. The computer program product of claim 15, wherein said data structure selecting means comprises:
    means for enabling the processor to select one or more data structures having the greatest number of elements until a size of said selected data structures is greater than a predetermined amount.

19. The computer program product of claim 15, wherein said data structure selecting means comprises:
    means for enabling the processor to select a predetermined number of data structures having the greatest number of elements.

20. The computer program product of claim 15, wherein said computer program logic further comprises:
    means, responsive to a determination that a combined size of all data structures stored in the primary storage medium plus a size of the data object is not greater than a predetermined threshold, for enabling the processor to store the data object in said target data structure in said primary storage medium.

21. The computer program product of claim 15, wherein said computer program logic further comprises:
    content determining means, responsive to a determination that an overflow mode condition currently exists, for enabling the processor to determine whether the target data structure is stored in the overflow storage medium;
    means, responsive to a determination that the target data structure is stored in the overflow storage medium, for enabling the processor to determine whether the overflow storage medium has adequate available storage capacity to accommodate the data object;
    means, responsive to a determination that the overflow storage medium has adequate available storage capacity to accommodate the data object, for enabling the processor to store the data object in the target data structure in the overflow storage medium; and
    means, responsive to a determination that the overflow storage medium does not have adequate available storage capacity to accommodate the data object, for enabling the processor to reject the data object.

22. The computer program product of claim 15, wherein said computer program logic further comprises:
    means, responsive to a determination that an overflow mode condition currently exists, for enabling the processor to determine whether the target data structure is stored in the overflow storage medium;
    second predetermined threshold means, responsive to a determination that the target data structure is not stored in the overflow storage medium, for enabling the processor to determine whether a combined size of all data structures stored in the primary storage medium plus a size of the data object is greater than a second predetermined threshold;
    second data structure selecting means, responsive to a determination that a combined size of all data structures stored in the primary storage medium plus a size of the data object is greater than the second predetermined threshold, for enabling the processor to select one or more second data structures currently stored in the primary storage medium;
    overflow capacity determining means, responsive to said second data structure selecting means, for enabling the processor to determine whether the overflow storage medium has sufficient available storage capacity to accommodate said selected second data structures; and
    means, responsive to a determination that the overflow storage medium has sufficient available storage capacity to accommodate said selected second data structures, for enabling the processor to move said selected second data structures from the primary storage medium to the overflow storage medium.

23. The computer program product of claim 22, wherein said computer program logic further comprises:
    means, responsive to a determination by said second predetermined threshold means that a combined size of all data structures stored in the primary storage medium plus a size of the data object is not greater than the second predetermined threshold, for enabling the processor to store the data object in the target data structure in the primary storage medium.

24. The computer program product of claim 22, wherein said computer program logic further comprises:

means, responsive to a determination that the overflow storage medium does not have sufficient available storage capacity to accommodate said selected second data structures, for enabling the processor to determine whether the target data structure is one of said selected second data structures;

means, responsive to a determination that the target data structure is one of said selected second data structures, for enabling the processor to reject the data object; and means, responsive to a determination that the target data structure is not one of said selected second data structures, for enabling the processor to store the data object in the target data structure in the primary storage medium.

25. The computer program product of claim 21, wherein said data structure moving means enables the processor to place identifiers of said selected data structures in an overflow name list, and wherein said content determining means enables the processor to check said overflow name list to determine whether said target data structure is stored in the overflow storage medium.

26. The computer program product of claim 15, wherein said computer program logic further comprises:

means for enabling the processor to receive a request to retrieve a second data object from a second target data structure;

means for enabling the processor to determine whether an overflow mode condition currently exists;

means, responsive to a determination that an overflow mode condition does not currently exist, for enabling the processor to access said primary storage medium to retrieve said second data object from said second target data structure;

means, responsive to a determination that an overflow mode condition currently exists, for enabling the processor to determine whether said second target data structure is stored on said overflow storage medium;

means, responsive to a determination that said second target data structure is stored on said overflow storage medium, for enabling the processor to access said overflow storage medium to retrieve said second data object from said second target data structure; otherwise, for enabling the processor to access said primary storage medium to retrieve said second data object from said second target data structure.

27. The computer program product of claim 15, wherein said computer program logic further comprises:

means, responsive to a determination that an overflow mode condition currently exists, for enabling the processor to exit the overflow mode condition if:

(I) no data structures are stored in the overflow storage medium; and (II) a combined size of all data structures stored in the primary storage medium is less than the predetermined threshold.

28. The computer program product of claim 22, wherein said first predetermined threshold is equal to said second predetermined threshold.

* * * * *